United States Patent
Yamaguchi et al.

(10) Patent No.: US 9,422,452 B2
(45) Date of Patent: Aug. 23, 2016

(54) POLYMERIZED FILM FORMING METHOD

(71) Applicant: TOKYO ELECTRON LIMITED, Tokyo (JP)

(72) Inventors: Tatsuya Yamaguchi, Nirasaki (JP); Yoshinori Morisada, Nirasaki (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 0 days.

(21) Appl. No.: 14/619,375

(22) Filed: Feb. 11, 2015

(65) Prior Publication Data

US 2015/0232702 A1 Aug. 20, 2015

(30) Foreign Application Priority Data

Feb. 18, 2014 (JP) ................................. 2014-028628

(51) Int. Cl.
*C23C 16/455* (2006.01)
*C09D 183/14* (2006.01)
*B05D 1/34* (2006.01)
*B05D 1/00* (2006.01)
*C08G 77/54* (2006.01)

(52) U.S. Cl.
CPC .............. *C09D 183/14* (2013.01); *B05D 1/34* (2013.01); *B05D 1/60* (2013.01); *C08G 77/54* (2013.01)

(58) Field of Classification Search
CPC ...... C23C 16/455; C23C 16/46; C23C 16/52
See application file for complete search history.

(56) References Cited

U.S. PATENT DOCUMENTS

| | | | | |
|---|---|---|---|---|
| 3,693,707 A | * | 9/1972 | Richter | B01D 7/02 165/101 |
| 5,120,505 A | * | 6/1992 | Lowell, Jr. | G01N 19/00 422/82.01 |
| 6,503,564 B1 | * | 1/2003 | Fleming | B05D 1/60 427/255.6 |
| 2004/0063883 A1 | * | 4/2004 | Hayashi | C08G 61/12 526/279 |
| 2009/0035424 A1 | * | 2/2009 | Mita | B23B 27/08 426/113 |
| 2012/0154910 A1 | * | 6/2012 | Yajima | B29D 11/00644 359/487.02 |

FOREIGN PATENT DOCUMENTS

| | | | |
|---|---|---|---|
| JP | 57-120916 | * | 7/1982 |
| JP | 2013-247285 A | | 12/2013 |
| JP | 2013-247287 A | | 12/2013 |
| JP | 2014-170764 A | | 9/2014 |

OTHER PUBLICATIONS

Seidel, Scott, et al., "Chemical Vapor Deposition of Polymer Films". Encyclopedia of Polymer Science and Technology, 2011, pp. 1-26.*
Asatekin, Ayse, et al., "Designing polymer surfaces via vapor deposition". Materials Today, May 2010, vol. 13, No. 5, pp. 26-33.*

* cited by examiner

*Primary Examiner* — Bret Chen
(74) *Attorney, Agent, or Firm* — Nath, Goldberg & Meyer; Jerald L. Meyer (57) ABSTRACT

A polymerized film forming method for forming a polymerized film on a target surface of a workpiece using a first raw material gas which contains a first monomer and a second raw material gas which contains a second monomer differing from the first monomer includes: supplying the first raw material gas wherein difunctional non-aromatic amine having a hydrolyzable group is used for the first monomer; and supplying the second raw material gas wherein difunctional acid anhydride is used for the second monomer.

13 Claims, 11 Drawing Sheets

Reaction 2

FIG. 6A 3-amino-propyltrimethoxysilane

FIG. 6B 3-amino-propyltriethoxysilane

FIG. 6C

POLYMERIZED FILM FORMING METHOD

CROSS-REFERENCE TO RELATED APPLICATION

This application claims the benefit of Japanese Patent Application No. 2014-028628, filed on Feb. 18, 2014, in the Japan Patent Office, the disclosure of which is incorporated herein in its entirety by reference.

TECHNICAL FIELD

The present disclosure relates to a polymerized film forming method and a polymerized film forming apparatus.

BACKGROUND

It is studied that a polymerized film, e.g., a polymer thin film represented by a polyimide thin film, is used as an interlayer insulating film of a semiconductor integrated circuit device or a liquid crystal alignment film of a flat panel display, e.g., a liquid crystal display device.

Polyimide is divided into aromatic polyimide and non-aromatic polyimide depending on the structure thereof. Non-aromatic polyimide has an advantage in that non-aromatic polyimide is lower in relative dielectric constant than aromatic polyimide and in that non-aromatic polyimide makes it possible to obtain a transparent film.

Non-aromatic polyimide provides an advantage absent in aromatic polyimide in that (a) a film having a low dielectric constant is obtainable and (b) a transparent film is obtainable. On the other hand, non-aromatic polyimide is inferior in heat resistance to aromatic polyimide.

SUMMARY

Some embodiments of the present disclosure provide a polymerized film forming method capable of, even with non-aromatic polyimide, forming a film while maintaining a superior heat resistance, and a film forming apparatus capable of implementing the film forming method.

According to one embodiment of the present disclosure, a polymerized film forming method for forming a polymerized film on a target surface of a workpiece using a first raw material gas which contains a first monomer and a second raw material gas which contains a second monomer differing from the first monomer includes: supplying the first raw material gas wherein difunctional non-aromatic amine having a hydrolyzable group is used as the first monomer, and supplying the second raw material gas wherein difunctional acid anhydride as the second monomer.

According to another embodiment of the present disclosure, provided is a polymerized film forming method for forming a polymerized film on a target surface of a workpiece using a first raw material gas which contains a first monomer and a second raw material gas which contains a second monomer differing from the first monomer, wherein the polymerized film is formed by repeating: (1) a reaction of dehydrating, condensing and polymerizing the first monomer and the second monomer; (2) a reaction of hydrolyzing the first monomer; and (3) a reaction of dehydrating, condensing and polymerizing the hydrolyzed first monomer.

According to another embodiment of the present disclosure, a polymerized film forming apparatus for forming a polymerized film on a target surface of a workpiece using a first raw material gas which contains a first monomer and a second raw material gas which contains a second monomer differing from the first monomer includes: a processing chamber configured to accommodate the workpiece; a film forming process gas supply mechanism configured to supply the first raw material gas and the second raw material gas into the processing chamber; a heating device configured to heat the workpiece; an exhaust device configured to evacuate an inside of the processing chamber; and a controller configured to control the film forming process gas supply mechanism, the heating device and the exhaust device, wherein the film forming process gas supply mechanism is configured to supply the first raw material gas and the second raw material gas of the film forming method described above as the first raw material gas and the second raw material gas.

BRIEF DESCRIPTION OF THE DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Some embodiments of the present disclosure will now be described with reference to the drawings. Throughout the drawings, identical parts will be designated by like reference symbols. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

(First Embodiment)
<Film Forming Method>

Figure 1:
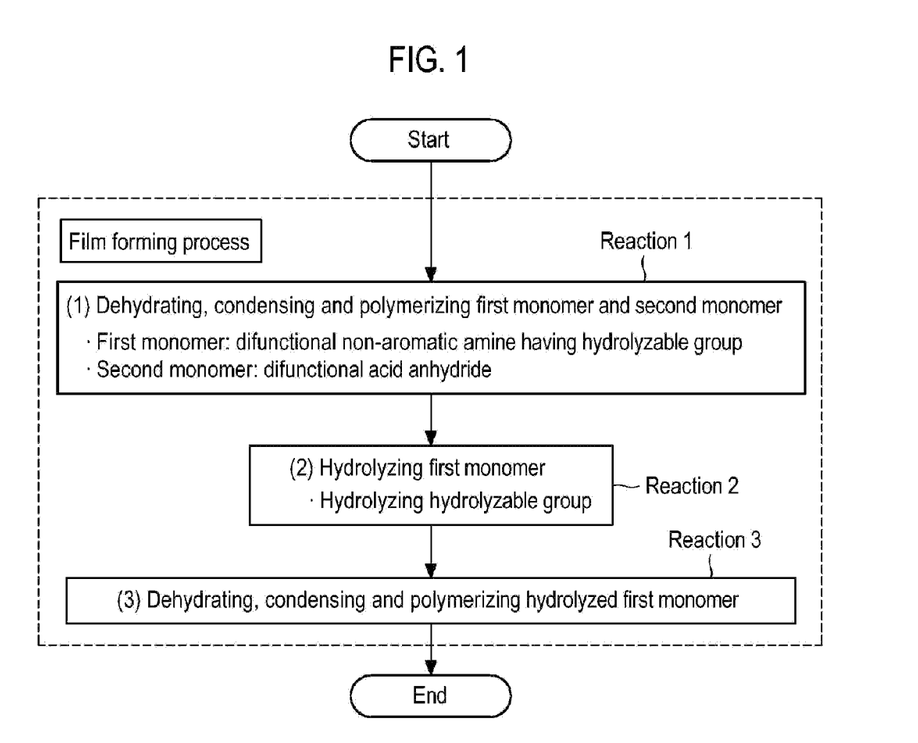
FIG. 1 is a flowchart showing one example of a polymerized film forming method according to a first embodiment of the present disclosure.
Figure 2A:
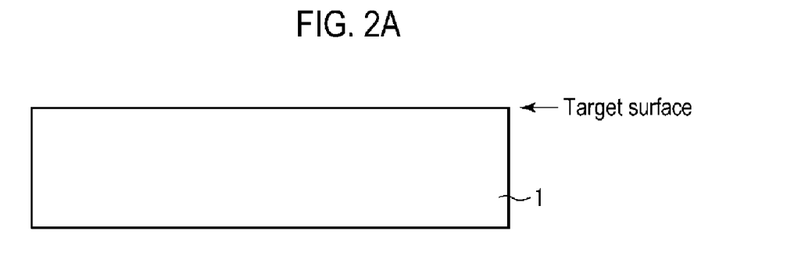
FIGS. 2A and 2B are sectional views showing states of a workpiece during the sequence shown in FIG. 1.
Figure 2B:
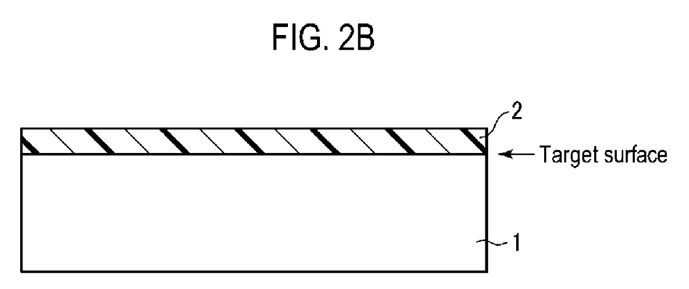

FIG. 1 is a flowchart showing one example of a polymerized film forming method according to a first embodiment of the present disclosure. FIGS. 2A and 2B are sectional views showing the states of a workpiece during the sequence shown in FIG. 1.

As described in a film forming process of FIG. 1, the polymerized film forming method according to the first embodiment of the present disclosure is a film forming method in which a polymerized film is formed on a target surface of a workpiece using a first raw material gas which contains a first monomer and a second raw material gas which contains a second monomer differing from the first monomer. One example of the workpiece may be a silicon wafer (hereinafter referred to as a wafer) 1 shown in FIG. 2A.

In the polymerized film forming method according to the first embodiment, difunctional non-aromatic amine having a hydrolyzable group is used as the first monomer, and difunctional acid anhydride is used as the second monomer. Thus, as shown in FIG. 2B, a non-aromatic polymerized film, e.g., a non-aromatic polyimide film 2 is formed on a target surface of the wafer 1.

In the film forming method according to the first embodiment of the present disclosure, for example, reactions as described below are continuously and repeatedly generated, whereby a non-aromatic polyimide film 2 is formed.

Figure 3A:
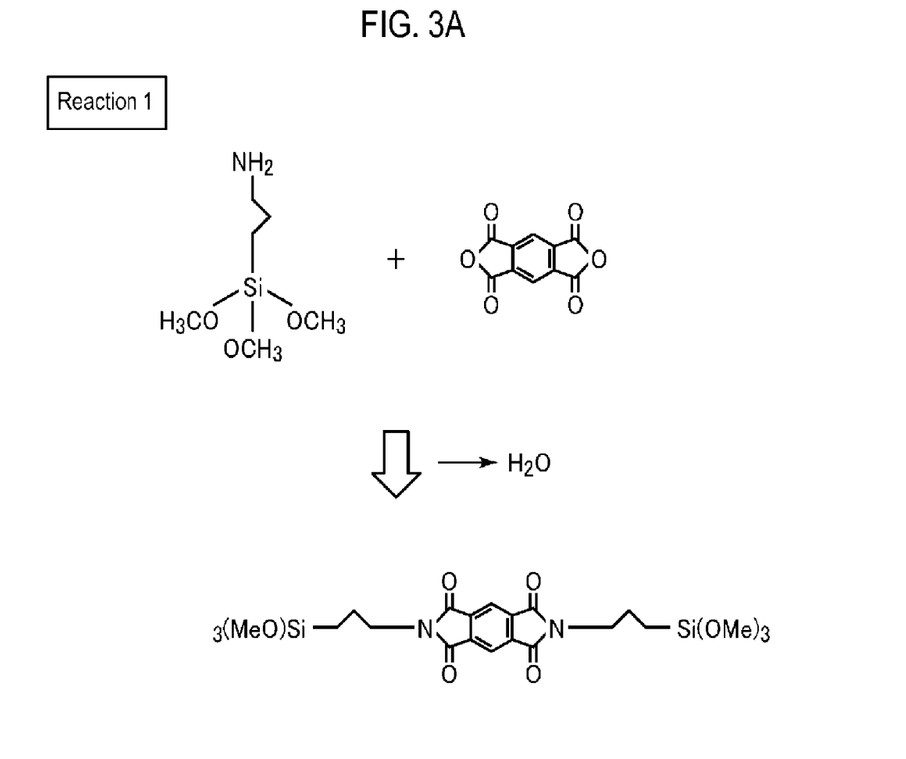
FIGS. 3A to 3C show reactions generated during a film forming process.
Figure 3B:
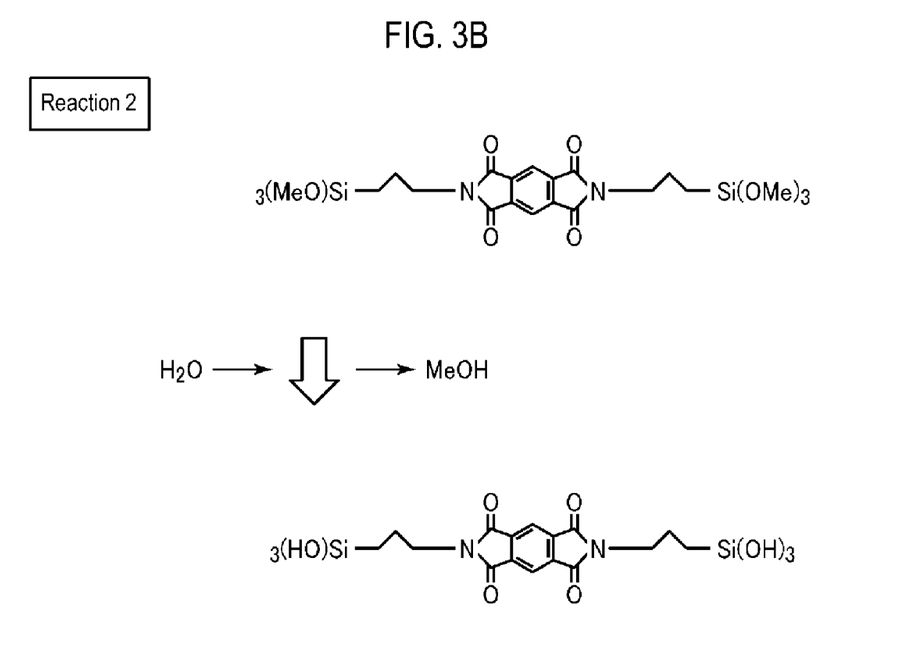
Figure 3C:
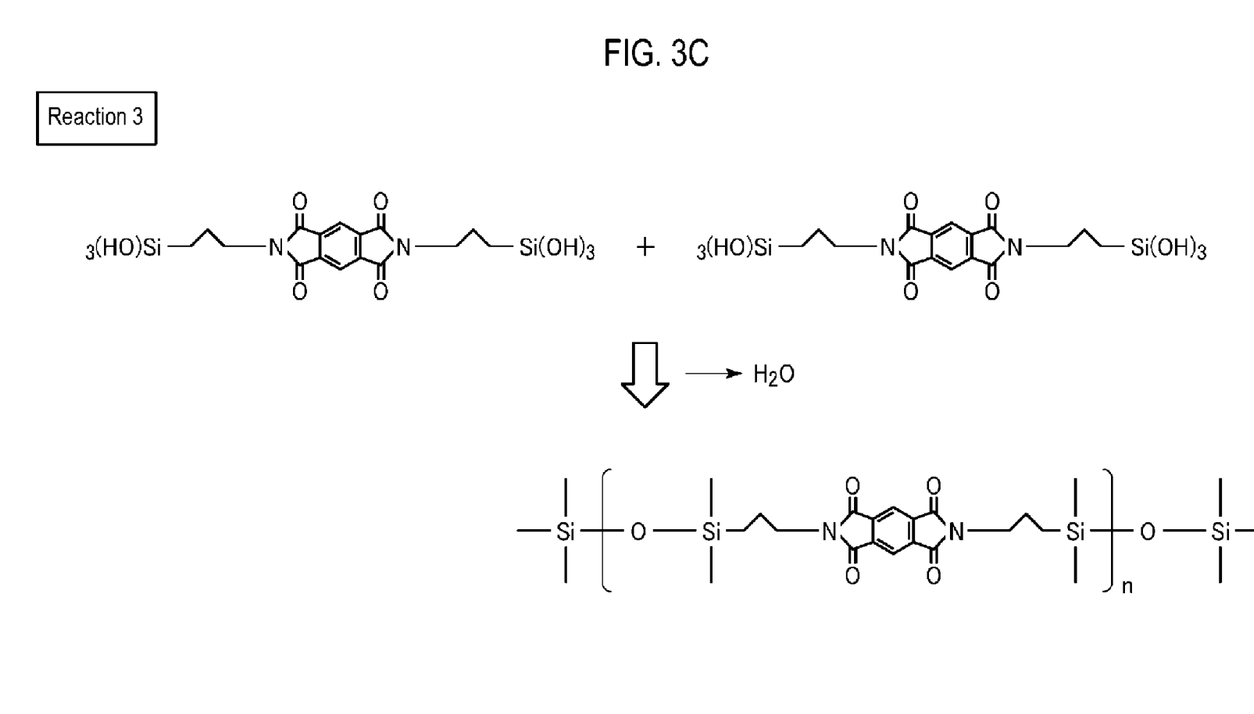

FIGS. 3A to 3C are views showing the reactions generated during a film forming process. In this example, "3-amino-propyltrimethoxysilane" was used as the difunctional non-aromatic amine having a hydrolyzable group, and "pyromellitic dianhydride (PMDA)" was used as the difunctional acid anhydride. "3-amino-propyltrimethoxysilane" is one of the silane coupling agents. In the following description, "3-amino-propyltrimethoxysilane" will be abbreviated as an SC agent.

In a first reaction, as shown in Reaction 1 of FIGS. 1 and 3A, an amino group contained in the SC agent and oxygen contained in the PMDA are dehydrated and condensed. Thus, the SC agent and the PMDA are polymerized. Specifically, $H_2O$ falls out of $NH_2$ (amino group) of the SC agent and O of a five-membered ring of the PMDA. Thus, a dumbbell structure is formed in which SC agents are bonded through two imide rings to the opposite sides of the PMDA.

Then, in a second reaction, as shown in Reaction 2 of FIGS. 1 and 3B, the hydrolyzable group contained in the SC agent is hydrolyzed. Thus, MeOH (methyl alcohol) falls out of the hydrolyzable group (alkoxy group in this example) bonded to Si, whereby the SC agent becomes SiOH (silanol) ($Si(OH)_3$ (trisilanol) in this example).

Then, in a third reaction, as shown in Reaction 3 of FIGS. 1 and 3C, the hydrolyzed SC agents are dehydrated and condensed. Thus, $H_2O$ falls out of OH of two silanols, whereby Si atoms are bonded to each other through O. In other words, two dumbbell structures are bonded to each other by siloxane to form a polyimide.

Reactions 1 to 3 are two-dimensionally or three-dimensionally and continuously generated during the film forming process shown in FIG. 1, whereby a non-aromatic polyimide film 2 is formed on the target surface of the wafer 1.

<Heat Resistance of Aromatic Polyimide and Typical Non-Aromatic Polyimide>

Figure 4:
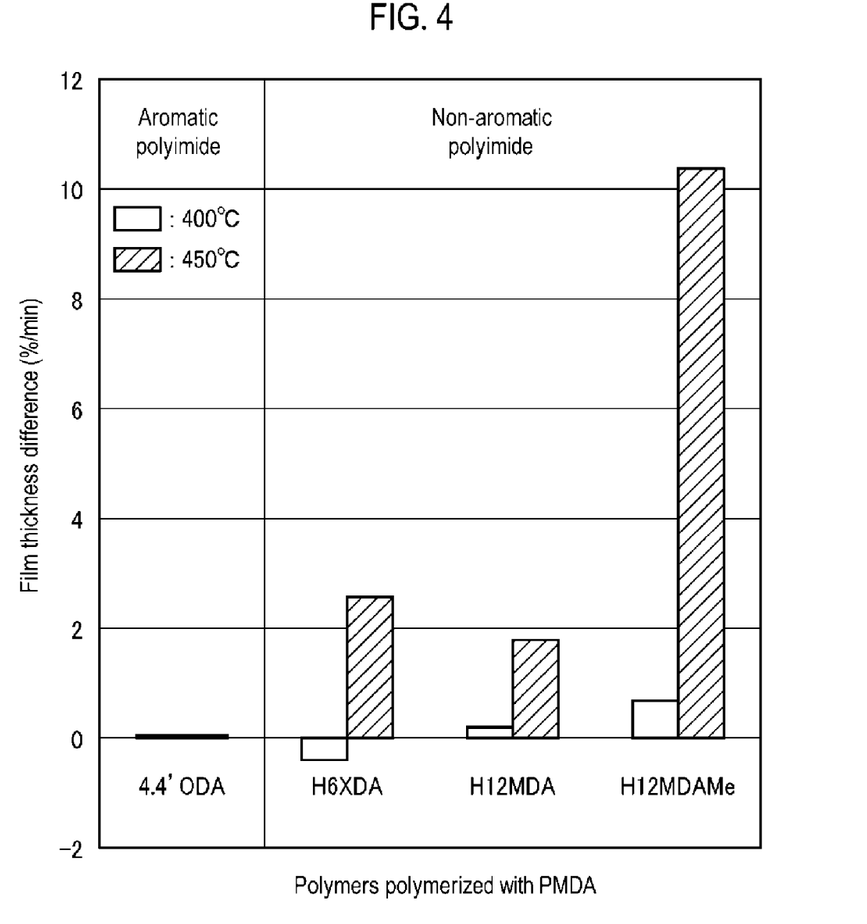
FIG. 4 is a view showing a heat resistance of aromatic polyimide and a heat resistance of typical non-aromatic polyimide.

FIG. 4 is a view showing a heat resistance of aromatic polyimide and a heat resistance of typical non-aromatic polyimide.

The horizontal axis in FIG. 4 indicates monomers (corresponding to the first monomer of the first embodiment) polymerized with PMDA (acid dianhydride). From the left side of the drawing sheet surface, there are indicated: 4,4'ODA (4,4'-oxydianiline); H6XDA (1,3'-bis(aminomethyl)cyclohexane); H12MDA (4,4'-diaminodicyclohexyl methane); and H12MDAMe (4,4'-diamino-3,3'-dimethylhexyl methane). Only the 4,4'ODA becomes aromatic polyimide. The remaining monomers become non-aromatic polyimide (aliphatic polyimide).

The vertical axis in FIG. 4 indicates a film thickness difference (pyrolysis rate). A reduction percentage (%) per 1 min of a film thickness is indicated with reference to a temperature of 400 degrees C. and a temperature of 450 degrees C.

As shown in FIG. 4, aromatic polyimide is hardly pyrolyzed at the temperature of from 400 to 450 degrees C., while non-aromatic polyimide (aliphatic polyimide) undergoes conspicuous pyrolysis in either case. This is because the dissociation energy of a C—N bond is dropped due to the electron donation from an aliphatic skeleton to an imide ring. In the case of an aromatic skeleton, the C—N bond is stabilized due to the electron attraction toward an imide ring. In other words, the improvement of a heat resistance may not be promised in the case of the aliphatic skeleton.

<Heat Resistance of Non-Aromatic Polyimide According to the First Embodiment and Typical Non-Aromatic Polyimide>

Figure 5:
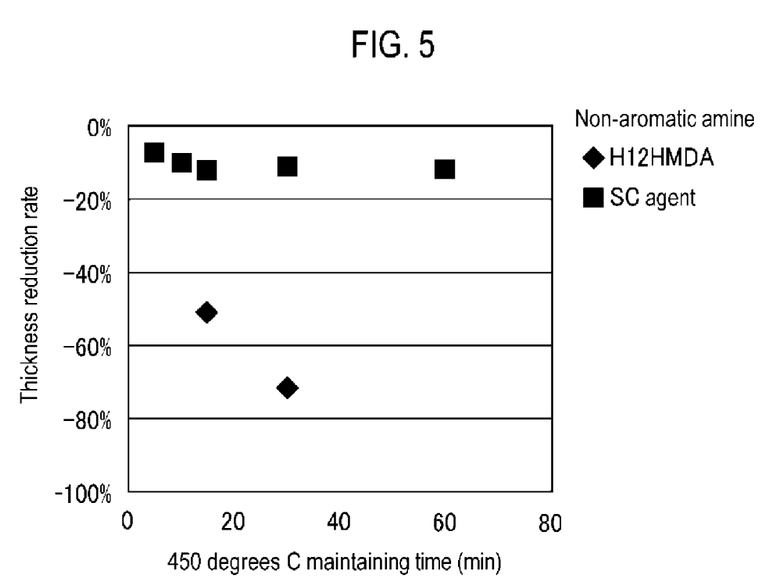
FIG. 5 is a view showing a heat resistance of non-aromatic polyimide according to a first embodiment and a heat resistance of typical non-aromatic polyimide.

FIG. 5 is a view showing a heat resistance of non-aromatic polyimide according to the first embodiment and a heat resistance of typical non-aromatic polyimide. The horizontal axis in FIG. 5 indicates a 450 degrees C. maintaining time, the unit of which is minutes. The vertical axis indicates a thickness reduction rate.

As shown in FIG. 5, in the case of the typical non-aromatic polyimide in which the monomer polymerized with PMDA is H12HMDA, if the typical non-aromatic polyimide is maintained for 30 min at a temperature of 450 degrees C., the thickness thereof is reduced by about 70% and is decreased to about 30% of the thickness of a film as formed.

On the other hand, in the case of the non-aromatic polyimide according to the first embodiment in which the monomer polymerized with PMDA is an SC agent, if the non-aromatic polyimide is maintained for 20 min at a temperature of 450 degrees C., the thickness thereof is reduced by about 10% and is decreased to about 90% of the thickness of a film as formed. Thereafter, the film thickness is not reduced regardless of the maintaining time. It was confirmed that, as compared with the typical non-aromatic polyimide (aliphatic polyimide), the non-aromatic polyimide according to the first embodiment has a high heat resistance.

The non-aromatic polyimide according to the first embodiment is polyimide having an imide ring and a siloxane skeleton. For that reason, the film is thermally stabilized by the three-dimensional cross-linking of siloxane, while maintaining the properties of polyimide having an aliphatic skeleton, namely (a) the property of obtaining a film having a low dielectric constant as compared with an aromatic polyimide and (b) the property of obtaining a transparent film which is not obtainable in an aromatic polyimide. In the non-aromatic polyimide according to the first embodiment, the pyrolysis rate at 450 degrees C. is 0.1%/min. It was confirmed that the heat resistance of the non-aromatic polyimide according to the first embodiment is 10 times or more as high as the heat resistance of the typical non-aromatic polyimide (aliphatic polyimide).

The reason for the heat resistance being increased with an aliphatic skeleton or a siloxane skeleton in this example appears to be that, particularly due to the three-dimensional cross-linking of siloxane, the thermal fluctuation of a structure is suppressed and a dissociation temperature of the aliphatic skeleton is increased. Further, there is a possibility that the hardness and the density of the film are changed by the three-dimensional cross-linking. In any case, according to the polymerized film forming method of the first embodiment, it is possible to obtain an advantage in that, even with non-aromatic polyimide, a film can be formed while maintaining good heat resistance.

The first monomer is difunctional non-aromatic amine having a hydrolyzable group. Particularly, in the first embodiment, the first monomer is "3-amino-propyltrimethoxysilane" containing an alkoxy group as a hydrolyzable group, which is used as a silane coupling agent. If a substance containing an alkoxy group as a hydrolyzable group is used as the first monomer in this way, it is possible to improve adhesion of the polymerized film 2 to the target surface of the wafer 1.

In other words, at an initial stage when the first monomer begins to be supplied onto the target surface of the wafer 1, the hydrolyzable group of the first monomer is hydrolyzed to become, e.g., an OH group. The OH group of the first monomer and the OH group bonded to the target surface of the wafer 1 pull against each other. If dehydration occurs in the OH groups pulled against each other, the first monomer is bonded to the target surface of the wafer 1 while possessing a reactive functional group or an amino group in the first embodiment. Reaction 1 shown in FIGS. 1 and 3A is generated in the amino group of the first monomer bonded to the target surface. The hydrolysis, and the dehydration and condensation shown in FIGS. 1, 3B and 3C are generated to thereby form a non-aromatic polyimide film 2 on the target surface of the wafer 1.

If a substance containing an alkoxy group as a hydrolyzable group, e.g., a silane coupling agent, is used as the first monomer in this way, it is possible to improve adhesion of the polymerized film 2 to the target surface of the wafer 1.
<First Monomer>

Next, a description will be made on examples of the first monomer applicable to the first embodiment of the present disclosure.

The first monomer may be difunctional non-aromatic amine having a hydrolyzable group, preferably primary amine. This is because, if the first monomer is, e.g., secondary amine, it becomes difficult to form an imide ring in the reaction with acid anhydride.

The hydrolyzable group may be an alkoxy group. This is because, if the hydrolyzable group is an alkoxy group, it is possible to increase adhesion between the polymerized film and the target surface of the wafer 1. It does not matter whether the alkoxy is methoxy or ethoxy. While the alkoxy is methoxy in the first embodiment, the alkoxy may further include ethoxy or may consist of only ethoxy.

The hydrolyzable group may not necessarily be, e.g., trialkoxy. Form the viewpoint of promoting the three-dimensional cross-linking, the hydrolyzable group may be three or more groups such as trialkoxy. In the case of, e.g., monoalkoxy, it is hard to form the three-dimensional cross-linking.

While the first monomer has a structure of a hydrocarbon group, there is no limit to the structure of the hydrocarbon group. While the hydrocarbon group is a propyl group in the first embodiment, the present disclosure is not limited thereto.

Figure 6A:
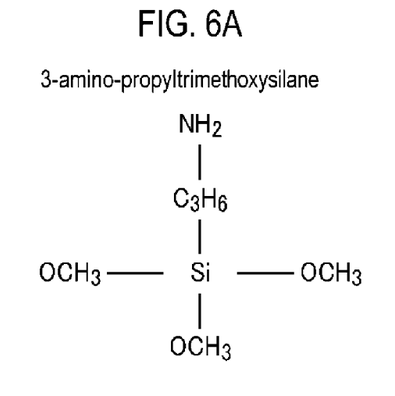
FIGS. 6A to 6C show examples of a first monomer.
Figure 6B:
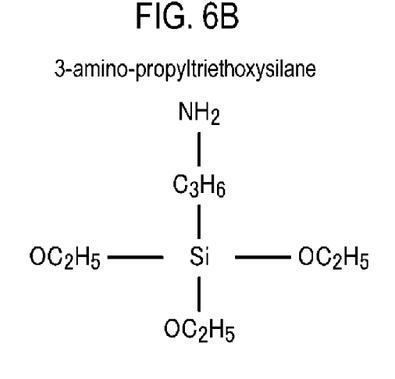
Figure 6C:
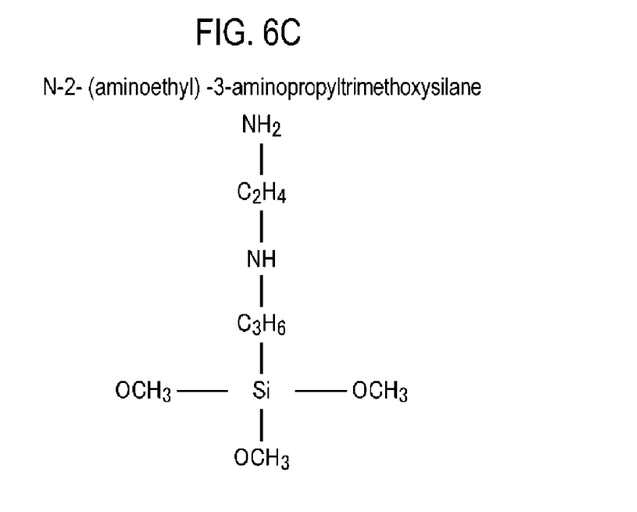

Some examples of the first monomer that may be used in the first embodiment of the present disclosure are shown in FIGS. 6A to 6C.

Examples of the first monomer may include: 3-aminopropyltrimethoxysilane (FIG. 6A); 3-aminopropyltriethoxysilane (FIG. 6B); and N-2-(aminoethyl)-3-aminopropyltrimethoxysilane (FIG. 6C). All the examples described above are SC agents. Needless to say, the first monomer is not limited to these SC agents.
<Film Formation Temperature of Polymerized Film>

Next, a description will be made on a range of a film formation temperature of a polymerized film.

A lower limit value of a film formation temperature of a polymerized film, or a non-aromatic polyimide film 2 in this example, is a temperature at which hydrolysis is generated in the first monomer as described with reference to FIG. 3B. The hydrolysis in the first monomer is also generated at room temperature, e.g., 20 degrees C.

An upper limit value of the film formation temperature of the non-aromatic polyimide film 2 is a temperature at which the non-aromatic polyimide film 2 is not pyrolyzed. However, if the film formation temperature is too high, there may be a case where the film formation temperature exceeds a heat resistance temperature (or a permissible process temperature) of a workpiece. If the film formation temperature exceeds the heat resistance temperature of the workpiece, the film formation temperature is not practically useable. As set forth above, the upper limit value of the film formation temperature also changes depending on the heat resistance temperature of the workpiece. For example, if the workpiece is a wafer used in manufacturing a semiconductor device and if the heat resistance temperature determined based on the structure of the wafer or the like is taken into account, the practically optimal upper limit value of the film formation temperature of the polymerized film is, e.g., 200 degrees C.

As described above, one example of the film formation temperature range of the polymerized film in the first embodiment is the temperature at which the polymerized film formed at room temperature or higher is not pyrolyzed. If the heat resistance temperature of the workpiece is taken into account, one example of the film formation temperature range may be room temperature or higher and 200 degrees C. or lower.

If one wishes to further promote the dehydration and condensation described with reference to FIGS. 3A and 3C, it may be possible to increase the lower limit value of the film formation temperature. The temperature at which the dehydration and condensation may be further promoted is, e.g., 100 to 150 degrees C. Accordingly, one example of the film formation temperature range in the case of considering the promotion of the dehydration and condensation is the temperature at which the polymerized film formed at 100 degrees C. or higher is not pyrolyzed. One example of the film formation temperature range in the case of considering both the promotion of the dehydration and condensation and the heat resistance temperature of the workpiece is 100 degrees C. or higher and 200 degrees C. or lower.
(Second Embodiment)
<Film Forming Apparatus>

Next, one example of a film forming apparatus capable of implementing the polymerized film forming method according to the first embodiment of the present disclosure will be described as a second embodiment of the present disclosure.

Figure 7:
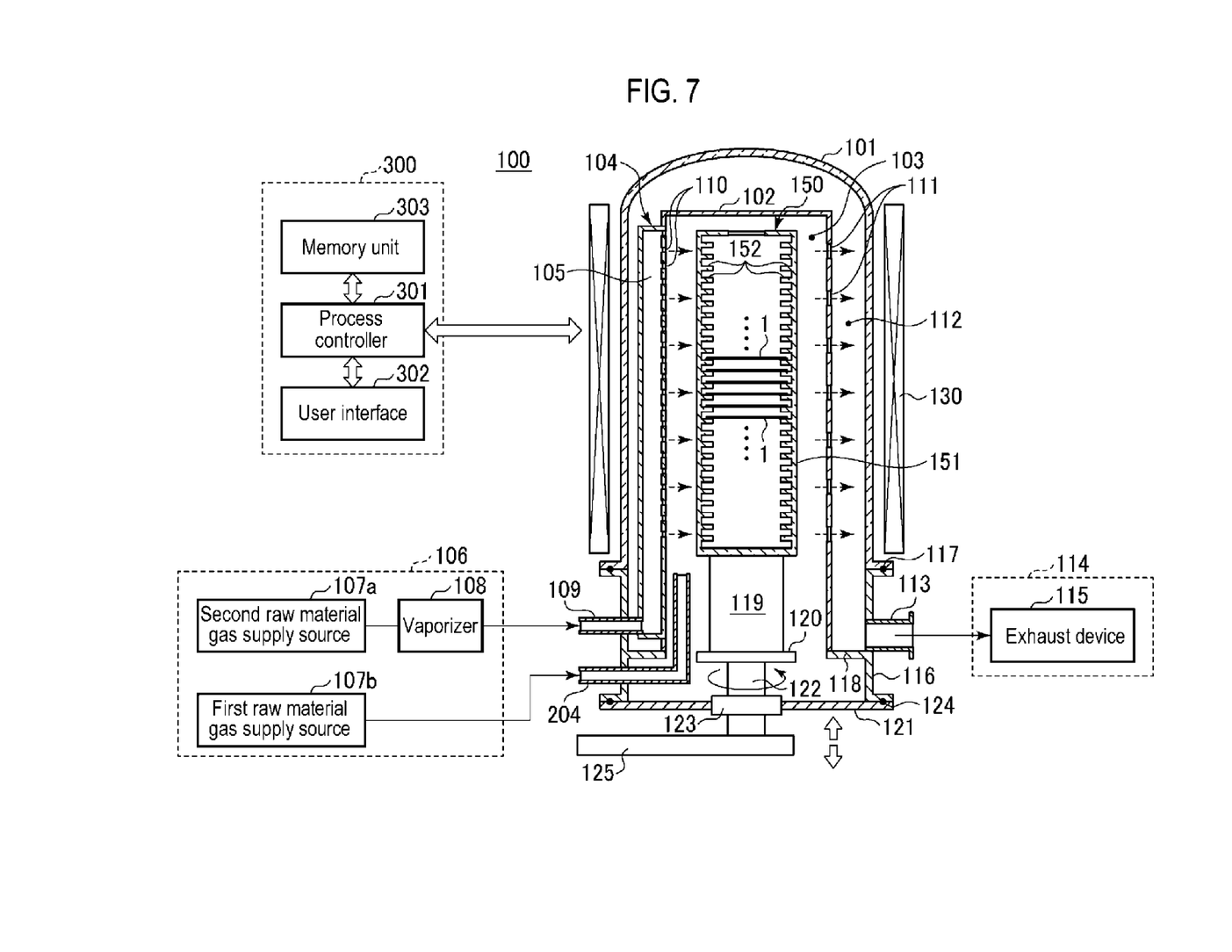
FIG. 7 is a sectional view schematically showing one example of a film forming apparatus according to a second embodiment of the present disclosure.

FIG. 7 is a sectional view schematically showing one example of a film forming apparatus according to a second embodiment of the present disclosure. As shown in FIG. 7, the film forming apparatus 100 is a vertical batch-type film forming apparatus that performs a film forming process by stacking a plurality of workpieces on a boat in a height direction. The film forming apparatus 100 includes a cylindrical outer tube 101 provided with a ceiling and a cylindrical inner tube 102 installed inside the outer tube 101 and provided with a ceiling. The outer tube 101 and the inner tube 102 are made of, e.g., quartz. The inside of the inner tube 102 serves as a processing chamber 103 which accommodates a plurality of workpieces, e.g., a plurality of wafers 1, and in which a film forming process of a polymerized film is performed with respect to all the wafers 1. In this example, a polymerized film, e.g., a polyimide film, is formed on the target surface of each of the wafers 1 using a vapor deposition polymerization method.

A gas introduction unit e.g., a vertically-extending injector 104, configured to introduce a film forming process gas into the processing chamber 103 is installed at one side of a sidewall of the inner tube 102 so as to extend in a height direction. The injector 104 includes a gas diffusion space 105 defined therein. The gas diffusion space 105 is connected to a film forming process gas supply mechanism 106.

The film forming process gas supply mechanism 106 includes a second raw material gas supply source 107a configured to supply a second raw material gas which contains a second monomer (e.g., difunctional acid anhydride), and a first raw material gas supply source 107b configured to supply a first raw material gas which contains a first monomer (e.g., difunctional non-aromatic amine having a hydrolyzable group).

A liquid second monomer or a second monomer dissolved in a solvent is stored in the second raw material gas supply source 107a. The second monomer is fed to a vaporizer 108 which vaporizes the second monomer. The vaporizer 108 is connected to a gas supply pipe 109. The gas supply pipe 109 is connected to the gas diffusion space 105. The vaporized second monomer is supplied together with a carrier gas, e.g., a nitrogen gas, into the gas diffusion space 105 through the gas supply pipe 109. The vaporized first monomer is injected into the processing chamber 103, e.g., in a horizontal direction, through a plurality of injection holes 110 formed in the injector 104.

As mentioned above, the film forming process gas supply mechanism 106 includes the first raw material gas supply source 107b configured to supply a first raw material gas which contains a first monomer. The first raw material gas supply source 107b includes a retention container which retains a first monomer, e.g., an SC agent, a heating device which heats and vaporizes the SC agent retained in the retention container, and so forth. The vaporized SC agent is sent together with a carrier gas, e.g., a nitrogen gas, to a supply nozzle 204.

The supply nozzle 204 is formed of, e.g., quartz pipe. The supply nozzle 204 extends inward through a sidewall of a manifold 116 and extends vertically after being bent upward. A first raw material gas which contains an adhesion promoter is supplied into the processing chamber 103 from the supply nozzle 204.

A plurality of exhaust holes 111 configured to evacuate the inside of the processing chamber 103 therethrough is formed at the other side of the sidewall of the inner tube 102. The exhaust holes 111 communicate with a space defined by the outer tube 101 and the inner tube 102. This space serves as an exhaust space 112 which is connected through an exhaust pipe 113 to an exhaust mechanism 114 configured to evacuate the inside of the processing chamber 103. The exhaust mechanism 114 includes an exhaust device 115, e.g., a vacuum pump. The exhaust mechanism 114 is configured not only to evacuate the internal atmosphere of the processing chamber 103 but also to set the internal pressure of the processing chamber 103 at a pressure required in the process.

The open end portion (or the lower end portion) of the outer tube 101 is connected through a seal member 117 such as an O-ring or the like to a manifold 116 which is formed into a cylindrical shape by, e.g., stainless steel. The manifold 116 supports the lower end portion of the outer tube 101. Further, the open end portion of the inner tube 102 is connected to, e.g., an inner tube support portion 118 formed in a flange shape on the inner circumferential surface of the manifold 116.

At the lower side of the manifold 116, a boat 150 capable of holding a plurality of workpieces, e.g., wafers 1, at multiple stages is disposed so that the boat 150 can be inserted into the processing chamber 103 through the inside of the inner tube support portion 118. The boat 150 is made of quartz and includes a plurality of posts 151. A plurality of grooves 152 is formed in each of the posts 151. The wafers 1 are supported in the grooves 152.

The boat 150 is placed on a table 120 through a heat-insulating cylinder 119 made of quartz. The table 120 is supported on a rotation shaft 122 which penetrates a lid 121 configured to open and close a lower end opening of the manifold 116 and made of, e.g., stainless steel. For example, a magnetic fluid seal 123 is installed in a penetration portion of the lid 121 which the rotation shaft 122 penetrates. The magnetic fluid seal 123 supports the rotation shaft 122 so that the rotation shaft 122 may rotate, while hermetically sealing the rotation shaft 122. A seal member 124 formed of, e.g., an O-ring, is installed between the peripheral portion of the lid 121 and the lower end of the manifold 116. Thus, the inside of the processing chamber 103 is kept sealed. The rotation shaft 122 is installed at the tip of an arm 125 which is supported by an elevator mechanism (not shown), e.g., a boat elevator. Consequently, the boat 150, the lid 121 and the like are unitarily moved up or down and are inserted into or removed from the inside of the processing chamber 103.

A heating device 130 is installed around the outer circumference of the outer tube 101 so as to surround the outer tube 101. The heating device 130 heats the wafers 1 accommodated within the processing chamber 103.

A control unit 300 is connected to the film forming apparatus 100. The control unit 300 includes a process controller 301 formed of, e.g., a microprocessor (or a computer). The respective constituent parts of the film forming apparatus 100 are controlled by the process controller 301. A user interface 302 and a memory unit 303 are connected to the process controller 301.

The user interface 302 includes an input unit including a touch panel display, a keyboard or the like, for enabling an operator to perform a command input operation or other operations in order to manage the film forming apparatus 100, and a display unit including a display or the like, for visually displaying the operating situation of the film forming apparatus 100.

The memory unit 303 stores a so-called process recipe which includes a control program for realizing, under the control of the process controller 301, various kinds of processes such as a film forming process and the like implemented by the film forming apparatus 100 and a program for causing the respective constituent parts of the film forming apparatus 100 to implement processes pursuant to process conditions. The process recipe is stored in a storage medium of the memory unit 303. The storage medium may be a hard disk or a semiconductor memory or may be a portable storage medium such as a CD-ROM, a DVD, a flash memory or the like. In addition, the process recipe may be appropriately transmitted from other devices via, e.g., a dedicated line.

If necessary, the process recipe is read out from the memory unit 303 in response to an operator's instruction transmitted from the user interface 302. The process indicated by the process recipe thus read out is executed by the process controller 301, whereby the film forming apparatus 100 implements a required process under the control of the process controller 301.

The polymerized film forming method according to the first embodiment of the present disclosure may be implemented by, e.g., the film forming apparatus 100 shown in FIG. 7.

While some embodiments of the present disclosure have been described above, the present disclosure is not limited to the aforementioned embodiments and may be variously modified without departing from the spirit and scope of the present disclosure.

For example, in the embodiments described above, the batch-type film forming apparatus 100 capable of holding a plurality of wafers 1 and simultaneously performing film formation with respect to the wafers 1 is illustrated as a film forming apparatus which embodies the present disclosure. However, the film forming apparatus is not limited to a batch-type one and may be single-wafer-type film forming apparatus which performs film formation on a wafer-by-wafer basis.

Moreover, the workpiece is not limited to the wafer 1. The present disclosure may be applied to other substrates such as an LCD glass substrate and the like. In addition, the present disclosure may be variously modified without departing from the spirit and scope thereof.

According to the present disclosure, it is possible to provide a polymerized film forming method capable of, even with non-aromatic polyimide, forming a film while maintaining a good heat resistance, and a film forming apparatus capable of implementing the film forming method.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A polymerized film forming method for forming a polymerized film on a target surface of a workpiece using a first raw material gas which contains a first monomer and a second raw material gas which contains a second monomer differing from the first monomer, the method comprising:
   supplying the first raw material gas wherein difunctional non-aromatic amine having a hydrolyzable group is used as the first monomer; and
   supplying the second raw material gas wherein difunctional acid anhydride is used as the second monomer,
   wherein the polymerized film is formed by repeating:
   (1) a reaction of dehydrating, condensing and polymerizing an amino group contained in the first monomer and acid anhydride contained in the second monomer;
   (2) a reaction of hydrolyzing the hydrolyzable group contained in the first monomer; and
   (3) a reaction of dehydrating, condensing and polymerizing the first monomer whose hydrolyzable group is hydrolyzed.

2. The method of claim 1, wherein the first monomer is primary amine.

3. The method of claim 2, wherein the hydrolyzable group is an alkoxy group.

4. The method of claim 3, wherein the first monomer comprises alkoxy silane.

5. The method of claim 4, wherein the first monomer is a silane coupling agent.

6. The method of claim 4, wherein the polymerized film is a film of polyimide having an imide ring and a siloxane skeleton.

7. The method of claim 1, wherein a film formation temperature of the polymerized film is a temperature at which a polymerized film formed at room temperature or higher is not pyrolyzed.

8. A polymerized film forming method for forming a polymerized film on a target surface of a workpiece using a first raw material gas which contains a first monomer and a second raw material gas which contains a second monomer differing from the first monomer,
   wherein the polymerized film is formed by repeating:
   (1) a reaction of dehydrating, condensing and polymerizing the first monomer and the second monomer;
   (2) a reaction of hydrolyzing the first monomer; and
   (3) a reaction of dehydrating, condensing and polymerizing the hydrolyzed first monomer.

9. The method of claim 8, wherein the first monomer is difunctional non-aromatic amine having a hydrolyzable group, and the second monomer is difunctional acid anhydride.

10. The method of claim 9, wherein the polymerized film is a film of polyimide having an imide ring and a siloxane skeleton.

11. The method of claim 8, wherein the first monomer is a silane coupling agent.

12. The method of claim 11, wherein, before the reaction (1) or during the reaction (1), there are generated:
   (4) a reaction of hydrolyzing the first monomer; and
   (5) a reaction of bonding the hydrolyzed first monomer to the target surface of the workpiece.

13. The method of claim 8, wherein a film formation temperature of the polymerized film is a temperature at which a polymerized film formed at room temperature or higher is not pyrolyzed.

* * * * *